United States Patent
Diaz Campos et al.

(10) Patent No.: US 10,705,250 B2
(45) Date of Patent: Jul. 7, 2020

(54) GENERATION OF ISOTHERM DATASETS FOR RESERVOIR VOLUMETRIC ESTIMATION

(71) Applicant: Schlumberger Technology Corporation, Sugar Land, TX (US)

(72) Inventors: Mery Diaz Campos, Houston, TX (US); Ravinath Kausik Kadayam Viswanathan, Boston, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 810 days.

(21) Appl. No.: 14/328,374

(22) Filed: Jul. 10, 2014

(65) Prior Publication Data

US 2015/0212233 A1    Jul. 30, 2015

Related U.S. Application Data

(60) Provisional application No. 61/932,188, filed on Jan. 27, 2014.

(51) Int. Cl.
   *G06F 17/18* (2006.01)
   *G01V 99/00* (2009.01)
   (Continued)

(52) U.S. Cl.
   CPC ............ *G01V 99/005* (2013.01); *G06F 30/20* (2020.01); *G06F 2111/06* (2020.01); *G06F 2111/08* (2020.01); *G06F 2111/10* (2020.01)

(58) Field of Classification Search
   CPC .................................................. G01V 99/005
   See application file for complete search history.

(56) References Cited

U.S. PATENT DOCUMENTS

| | | | |
|---|---|---|---|
| 7,254,091 B1 * | 8/2007 | Gunning | G01V 11/00 367/73 |
| 2006/0005608 A1 * | 1/2006 | Kitzhoffer | G01N 15/0893 73/38 |

(Continued)

FOREIGN PATENT DOCUMENTS

WO    2015031088 A1    3/2015

OTHER PUBLICATIONS

"Shale Gas-in-Place Calculations Part I: New Pore-Scale Considerations", Ray J. Ambrose et al., University of Oklahoma.*

(Continued)

*Primary Examiner* — Timothy A Mudrick
(74) *Attorney, Agent, or Firm* — Colin L. Wier; Alec McGinn; Gary Gex

(57) ABSTRACT

A computer-implemented method for reservoir volumetric estimation, a non-transitory computer-readable medium, and a computing system. The method may include running a molecular dynamics simulation of a fluid-rock model of a first reservoir system at a plurality of pressures. The fluid-rock model includes a fluid that is at least partially adsorbed in the first reservoir system at one or more pressures of the plurality of pressures. The method may also include calculating a plurality of isothermal density profiles of the fluid in the first reservoir system, in association with the plurality of pressures using a result of the molecular dynamics simulation. The method may further include determining a first gas accumulation of the fluid in the first reservoir system for the plurality of isothermal density profiles. The first gas accumulation is at least partially a function of a pore surface area of a sample of the first reservoir system.

20 Claims, 12 Drawing Sheets

(51) Int. Cl.
  *G06F 30/20* (2020.01)
  *G06F 111/06* (2020.01)
  *G06F 111/08* (2020.01)
  *G06F 111/10* (2020.01)

(56) References Cited

U.S. PATENT DOCUMENTS

| | | | |
|---|---|---|---|
| 2011/0191029 A1* | 8/2011 | Jalali | E21B 49/087 702/6 |
| 2012/0271609 A1* | 10/2012 | Laake | G01V 1/003 703/10 |
| 2013/0018641 A1 | 1/2013 | Prisco et al. | |
| 2015/0066464 A1* | 3/2015 | Altman | G01V 99/005 703/10 |

OTHER PUBLICATIONS

Richard F. Sigal et al. "The Laboratory Measurement of thevGas-Storage Capacity of Organic Shales", p. 224-235, Jun. 2013. (Year: 2013).*

Yonggang Zhao et al. "Identifing reservoir fluid properties in Daniudi Paleozoic gas field by fuzzy clustering analysis method", p. 316-320 (Year: 2012).*

Daniel J.K. Ross et al. "The importance of shale composition and pore structure upon gas storage potential of shale gas reservoirs" (Year: 2008).*

Akkutlu, et al., "Pore-size Dependence of Fluid Phase Behavior and Properties in Organic-Rich Shale Reservoirs", SPE-164099-MS, SPE International Symposium on Oilfield Chemistry, The Woodlands, Texas, Apr. 8-10, 2013, 19 pages.

Ambrose, et al., "Shale Gas-in-Place Calculations Part I: New Pore-Scale Considerations", SPE-131772-PA, vol. 17, Issue 1, 2012, pp. 219-229.

Diaz Campos, et al., "A Molecular Dynamics Study on Natural Gas Solubility Enhancement in Water Confined to Small Pores", SPE-124491-MS, SPE Annual Technical Conference and Exhibition, New Orleans, Louisiana, Oct. 4-7, 2009, 10 pages.

Diaz Campos. "Uncertainties in Shale Gas In-Place calculation: Molecular Dynamics Approach", Retrieved from the Internet: URL: http://mpge.ou.edu/research/documents/2010%20thesis/Mery%20Diaz.pdf, 2010.

Gasparik, et al., "High-Pressure Methane Sorption Isotherms of Black Shales from the Netherlands", Energy Fuels, vol. 26, No. 8, 2012, pp. 4995-5004.

Jabbarzadeh, et al., "Molecular Dynamics Simulation and its application to Nano-Rheology", Rheology Reviews, 2006, pp. 165-216.

Murata, et al., "A new determination method of absolute adsorption isotherm of supercritical gases under high pressure with a special relevance to density-functional theory study", The Journal of Chemical Physics, 114, No. 9. 2001, p. 4196-4205.

NIST, "Thermophysical Properties of Fluid Systems", National Institute of Standards and Technology web-book; Retrieved from the Internet: URL: http://webbook.nist.gov/chemistry/fluid/.

Zhang, et al., "Effect of potential energy on the formation of methane hydrate", Journal of Petroleum Science and Engineering, vol. 76, Issues 3-4, Mar. 2011, pp. 148-154.

Frenkel, et al., "Understanding Molecular Simulation Second Edition: From Algorithms to Applications", Computational Science, ISBN-13: 978-012267351, Nov. 7, 2001, pp. 11-20, 63-107.

Search and Examination Report issued in GB application 1500283.5 dated May 6, 2015, 6 pages.

* cited by examiner

GENERATION OF ISOTHERM DATASETS FOR RESERVOIR VOLUMETRIC ESTIMATION

CROSS-REFERENCE TO RELATED APPLICATIONS

This application claims priority to U.S. Provisional Patent Application having Ser. No. 61/932,188, filed on Jan. 27, 2014, the entirety of which is incorporated herein by reference.

BACKGROUND

The contents of a subterranean hydrocarbon reservoir may be estimated, for example, prior to some exploration and/or production efforts, in order to determine whether the reservoir is economically viable to produce. For example, such estimates may consider free gas, dissolved gas, and adsorbed gas. Adsorbed gas may be the gas that is located in a layer that is formed on the internal surface area of the formation matrix.

Various techniques have been developed for estimating "conventional" reservoirs (those reservoirs produced using conventional oil well methods). These techniques have been modified to apply to un-conventional reservoirs (reservoirs produced by other methods), such as shales and coals.

Reservoirs found in organic-rich shales and coals contain hydrocarbon fluids that are under a strong influence of the pore walls of the rock. This is attributed to the high surface area to volume ratio of the small pores, the fluid-pore wall interaction modulated by the wettability, and by the small pore-size distribution. The pore-size distribution of these organic shales is generally in the nanometric level ($10^{-9}$ m). At the nanometric scale, pore wall interaction may provide fluid-phase transition and physicochemical properties of the fluids. The fluid-pore wall interactions may also determine the adsorption mechanism. This may result in a complex density profile of the fluid form the pore walls to the centers of the pores. The density profile may also be a function of the pressure and temperature of the system.

Experimentally The adsorption of the gas molecules in a gas shale on the pore walls may lead to unique nuclear magnetic resonance (NMR) characteristics caused by a "gas wetting" phenomenon.

Adsorption is generally considered in terms of "isotherms;" that is, the adsorption is a function of pressure at a particular temperature. Isotherm tables used in oil and gas reservoir estimation are based on the Langmuir equation. To precisely employ the Langmuir equation, a detailed isotherm analysis in the laboratory of a well core at every pressure, up to the reservoir pressure, is needed, which may be impracticable.

Furthermore, employing the Langmuir-based approach involves an iterative calculation to estimate two constants: Langmuir pressure and Langmuir volume, to create an isotherm curve for each specific sample. Such an isotherm curve represents a situation where a single adsorption layer is assumed for any porous media. Hence, it is an approximation for determining the fluid properties and the volumetric approach for calculating the reserve of organic-rich shales and coal reservoirs. Further, a Langmuir curve is measured on one sample, and the results are extrapolated to determine the volumetric calculations in the whole field.

SUMMARY

Embodiments of the disclosure may provide a computer-implemented method, a non-transitory computer-readable medium, and a computing system. The method may be, in some embodiments, used for reservoir volumetric estimation. Further, the method may include running, using a processor, a molecular dynamics simulation of a fluid-rock model of a first reservoir system at a plurality of pressures. The fluid-rock model includes a fluid that is at least partially adsorbed in the first reservoir system at one or more pressures of the plurality of pressures. The method may also include calculating, using a processor, a plurality of isothermal density profiles of the fluid in the first reservoir system, in association with the plurality of pressures using a result of the molecular dynamics simulation. The method may further include determining, using a processor, a first gas accumulation of the fluid in the first reservoir system for the plurality of isothermal density profiles. The first gas accumulation is at least partially a function of a pore surface area of a sample of the first reservoir system.

The foregoing summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 10-1 and 10-2 illustrate a number of methane particles versus distance from a pore wall (e.g., along the pore half-length), at two different pressures and the same temperature, according to an embodiment.

FIGS. 11-1 and 11-2 illustrate isothermal density profiles for the methane fluid versus distance from the pore wall, according to an embodiment.

FIGS. 15-1 and 15-2 conceptually illustrate a calculation of surface excess mass, per unit area, using isothermal density profiles such as shown in FIGS. 11-1 and 11-2, according to an embodiment.

DETAILED DESCRIPTION

Figure 1:
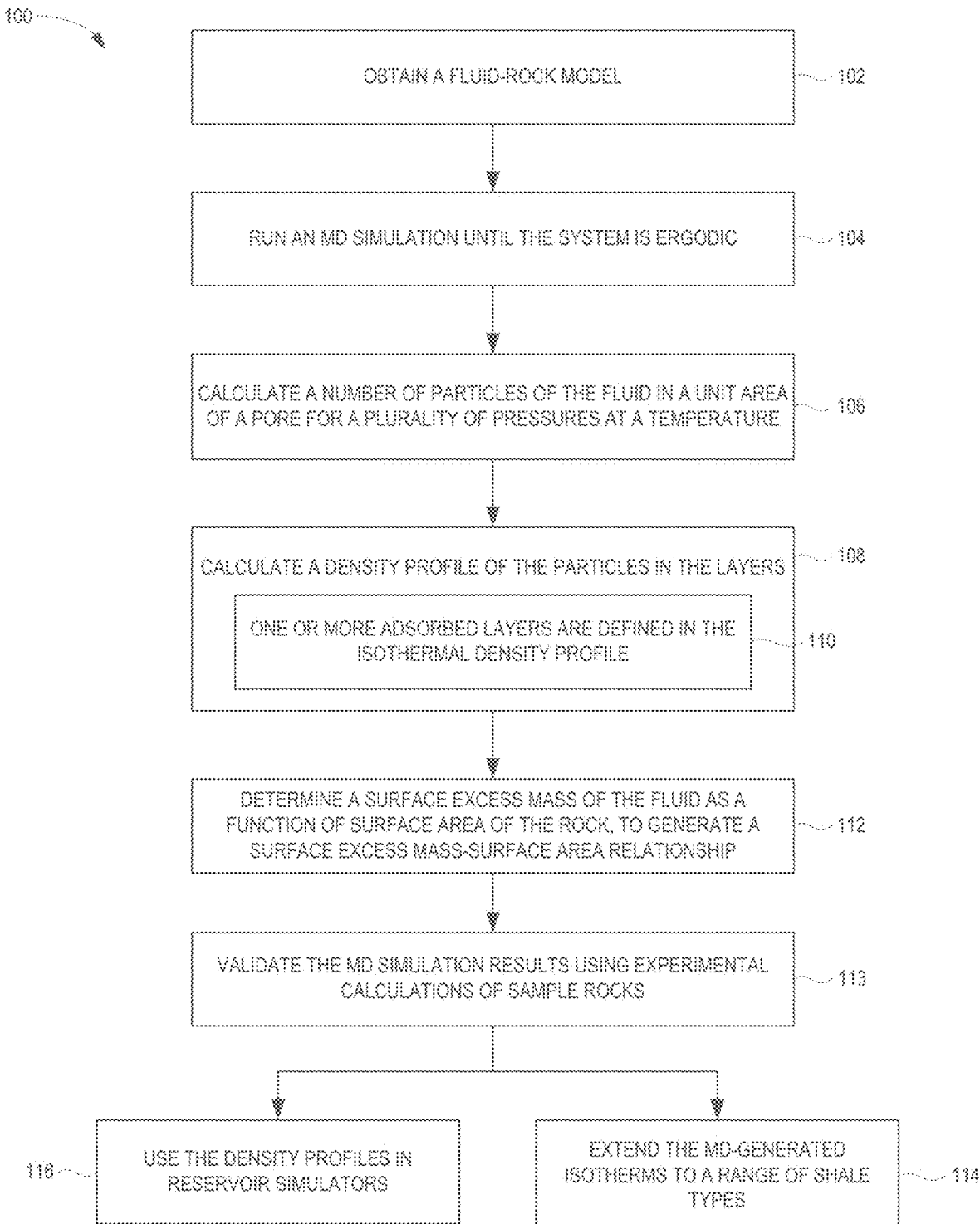
FIG. 1 illustrates a flowchart of a method for reservoir volumetric estimation, according to an embodiment.

The following detailed description refers to the accompanying drawings. Wherever convenient, the same reference numbers are used in the drawings and the following description to refer to the same or similar parts. While several embodiments and features of the present disclosure are described herein, modifications, adaptations, and other implementations are possible, without departing from the spirit and scope of the present disclosure.

Embodiments of the present disclosure may include a method for reservoir volumetric estimation of a fluid, e.g., in an unconventional reservoir. The method may include employing a numerical molecular modeling approach to determine the adsorbed phase density from the first principles of Newtonian mechanics. Molecular modeling and simulation ("Molecular Dynamics simulation") is a form of computer simulation that may facilitate observing thermodynamic and transport properties of many-particle systems. According to an embodiment of the method, such particles (e.g., the atoms and molecules that make up the hydrocarbon fluids and pore walls) with initially-known and instantaneously-predicted positions and momenta are allowed to interact for a period of time, with the motion of the particles represented as trajectories in space and time. Numerical integration of the Newton's equations of motion may be included in the simulation. Further, embodiments of the present method may include creating an isotherm dataset using Molecular Dynamics (MD) simulation results.

In particular, in some embodiments, the method may include associating a pore surface area of a reservoir formation with a gas accumulation (e.g., surface excess mass) of an adsorbed fluid, e.g., methane in a representative modeled or "first" reservoir system. In some embodiments, the pore surface area may be derived from a sample (e.g., a cutting) taken from a wellbore. Moreover, it will be appreciated that a "reservoir system" is not necessarily intended to mean that the system is indicative of the reservoir in its entirety. Rather, as the term is used herein, "reservoir system" means a system that is part of a reservoir. For example, some reservoir systems may be "near wellbore" systems, which may be used to characterize areas extending away from the wellbore by a relatively short distance. Accordingly, a single reservoir may include one or several "reservoir systems" (e.g., several near-wellbore systems).

A library of isotherms, at a range of pressures, may be developed, which may link the gas accumulation to pore surface area of one or more samples from a first reservoir system. Cuttings and/or core samples from a second reservoir system (which may be part of the same or a different reservoir) may then be analyzed to determine the surface area thereof. Formation pressure may also be measured for the second reservoir system. Using the library of isotherms, along with the measured surface area and formation pressure, the gas accumulation may be estimated. Thus, the gas accumulation may be determined while generally avoiding analogy to conventional gas reservoirs, and application of the Langmuir (or modified-Langmuir) equation.

Turning now to the illustrated embodiments, FIG. 1 depicts a flowchart of a method 100 for reservoir volumetric estimation, according to an embodiment. The method 100 may begin by obtaining a fluid-rock model of a reservoir system, as at 102. Obtaining the fluid-rock model may include generating or receiving a rock model of, for example, a porous, organic medium. Representative systems may be employed as models for other, similar systems and thus may be employed for the rock model. For example, some reservoir systems have been analyzed in great detail, and, as such, may be used as training models representative of similar reservoirs. Accordingly, a priori known information about such a reservoir system may be employed to construct a rock model that is generally applicable to other systems, e.g., the reservoir system being modeled in the method 100. In certain embodiments, the rock model may be already constructed, and "obtaining" the model may refer to fetching a pre-determined model from a storage location.

Figure 2:
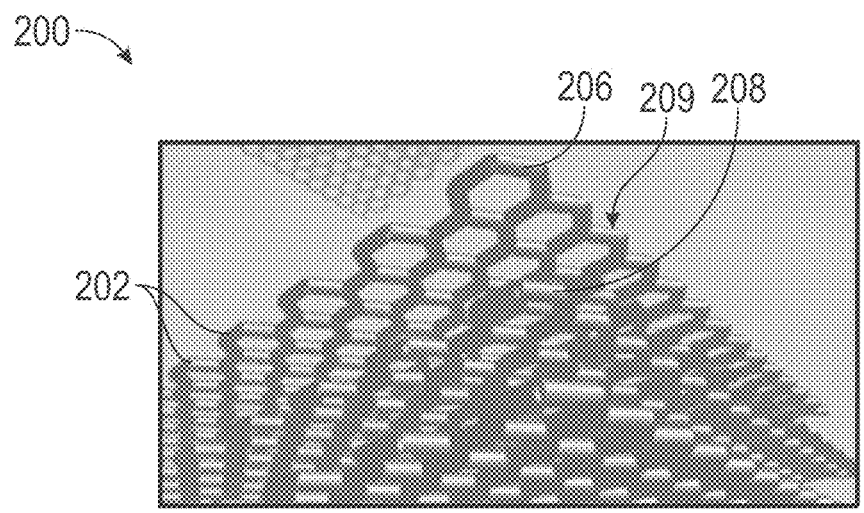
FIGS. 2 and 3 illustrate enlarged views of a pore of a rock model, according to an embodiment.
Figure 3:
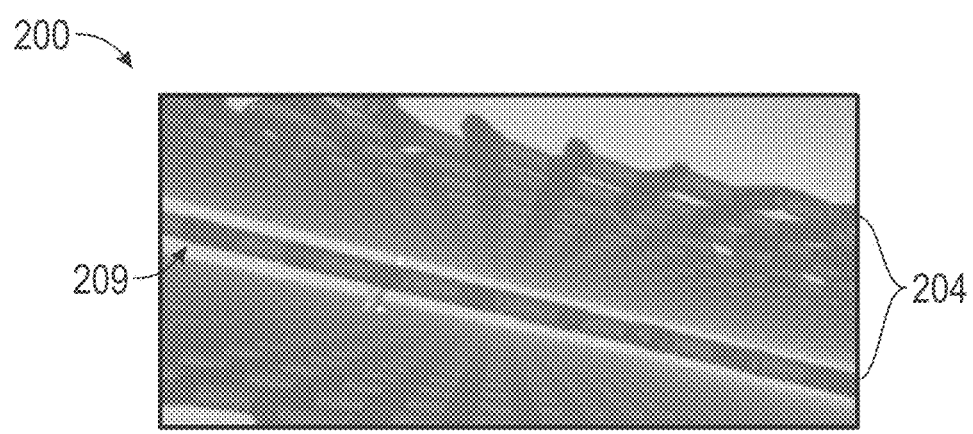

FIGS. 2 and 3 illustrate enlarged portions of a rock model 200, according to an embodiment. In an embodiment, the rock model 200 may include carbon particles positioned in time and space, making up interconnected benzene rings 202. The benzene rings 202 may be aromatic compounds that make up kerogen, asphaltene, and other organic-aromatic hydrocarbon materials. Further, the benzene rings 202 may be formed into graphene layers 204. One or several of the graphene layers 204 may form a first pore wall 206. A second set of one or several graphene layers may form a second pore wall 208. The distance between the first and second pore walls 206, 208 may define a pore 209, with the value of the distance being referred to as the pore width. In one specific embodiment, the pore width may be about 4 Å.

Referring specifically to FIG. 3, there is illustrated a view of the rock model 200, with the view being generally parallel to the graphene layers 204. With the graphene layers 204 being modeled as generally parallel layers, the pores 209 may have an elongated, slit shape; however, in other embodiments, the pores 209 may have any other shape. The rock model 200 may include a multiplicity of such pores 209, which may define a porous medium for the rock model 200.

Figure 4:
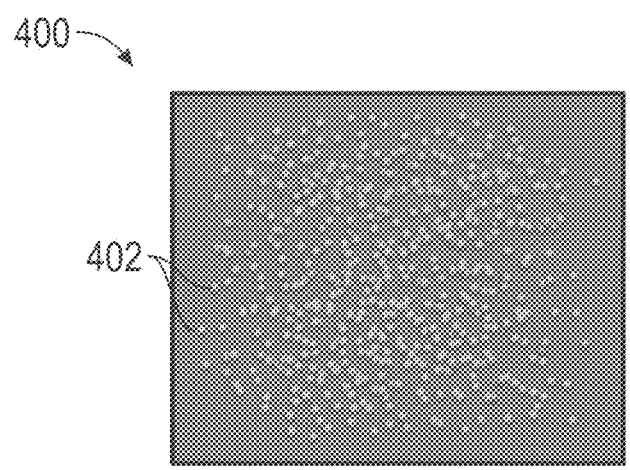
FIG. 4 illustrates a view of an orthorhombic fluid particle model, according to an embodiment.

Obtaining the fluid-rock model at 102 may also include creating a fluid model for the reservoir system. FIG. 4 illustrates a cross-section of a fluid model 400 at thermodynamic equilibrium. The fluid model 400 may include a plurality of particles 402 that may be, for example, methane. In other embodiments, any other type of particle may be used; however, methane is described herein as an illustrative example, without limitation. In an embodiment, the methane, made up of the particles 402, may be at thermodynamic equilibrium and at supercritical conditions, while being, for example, constrained to orthorhombic boundary conditions.

To model the methane particles 402 (or another type of particle 402), one, some or all of the particles 402 at their respective, specific positions may be considered to have a mass density that matches the standard bulk density thereof, e.g., as provided by a database, such as a table maintained by the National Institute of Standards and Technology (NIST). The methane particles 402 may thus be considered in the context of the space within one of the pores 209 (see FIGS. 2 and 3) of a known volume. Thus, the bulk density may serve as the starting point for simulation under a plurality of temperature and pressure conditions, e.g., as shown in Tables 1.

TABLE 1

Density of Bulk Methane at 73° F.

| Pressure (psi) | NIST density (g/cc) | MD density (g/cc) | $N^*_{CH4}$ |
|---|---|---|---|
| 155 | 0.007 | 0.007 | 53 |
| 430 | 0.020 | 0.020 | 112 |
| 1280 | 0.067 | 0.067 | 238 |
| 1825 | 0.098 | 0.098 | 300 |
| 2370 | 0.129 | 0.129 | 355 |
| 2700 | 0.147 | 0.147 | 385 |
| 3150 | 0.166 | 0.166 | 414 |
| 3750 | 0.182 | 0.182 | 443 |
| 4470 | 0.201 | 0.201 | 472 |
| 5120 | 0.218 | 0.218 | 501 |
| 5750 | 0.235 | 0.235 | 530 |
| 6250 | 0.248 | 0.249 | 559 |
| 6720 | 0.261 | 0.261 | 589 |

TABLE 2

Density of Bulk Methane at 115° F.

| Pressure (psi) | NIST density (g/cc) | MD density (g/cc) | $N^*_{CH4}$ |
|---|---|---|---|
| 190 | 0.008 | 0.008 | 48 |
| 450 | 0.020 | 0.020 | 100 |
| 1280 | 0.059 | 0.059 | 208 |
| 1780 | 0.084 | 0.084 | 262 |
| 2300 | 0.110 | 0.110 | 311 |
| 2680 | 0.127 | 0.128 | 340 |
| 3200 | 0.146 | 0.147 | 370 |
| 3800 | 0.162 | 0.163 | 399 |
| 4550 | 0.182 | 0.183 | 429 |
| 5100 | 0.197 | 0.199 | 458 |
| 5800 | 0.216 | 0.217 | 488 |
| 6400 | 0.233 | 0.233 | 518 |
| 6850 | 0.245 | 0.245 | 547 |

As will be appreciated, Tables 1 and 2 also provide examples of the number of methane particles 402 used for the simulation ($N^*_{CH4}$). Further, the average number of methane particles 402 within an operator, such as a sphere having any suitable radius, for example, about 6.2 Å, may be calculated. This may provide information related to the distribution of methane gas particles 402 under particular pressure and temperature conditions. Although a spherical operator for determining distribution is employed, it will be appreciated that one or more other operators may be used. Further, a united-atom carbon-centered Lennard-Jones potential may be used to represent methane force field, based on the optimized potentials for liquid simulations.

Figure 5:
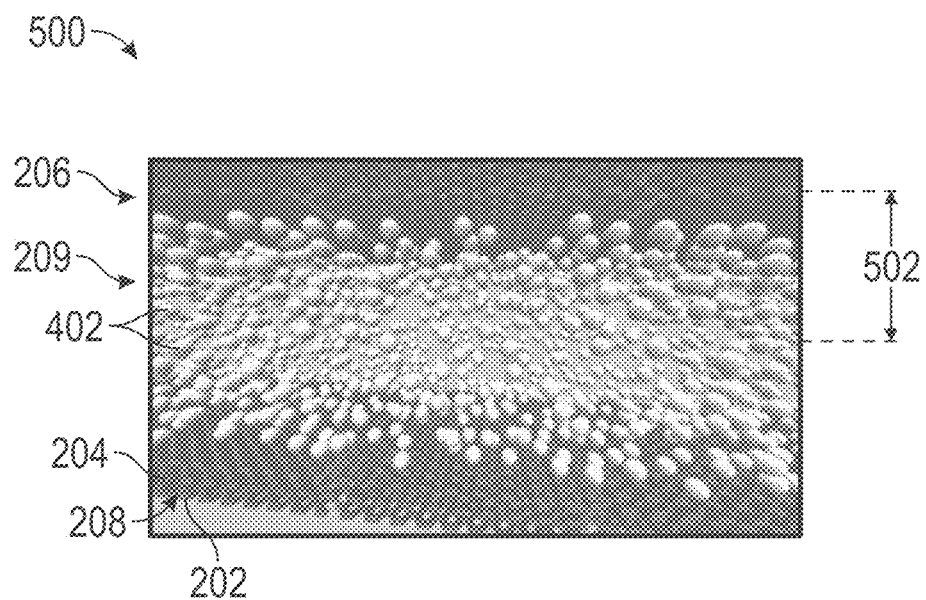
FIGS. 5 and 6 illustrate views of a fluid-rock model depicting a pore with fluid particles under two different pressures, according to an embodiment.
Figure 6:
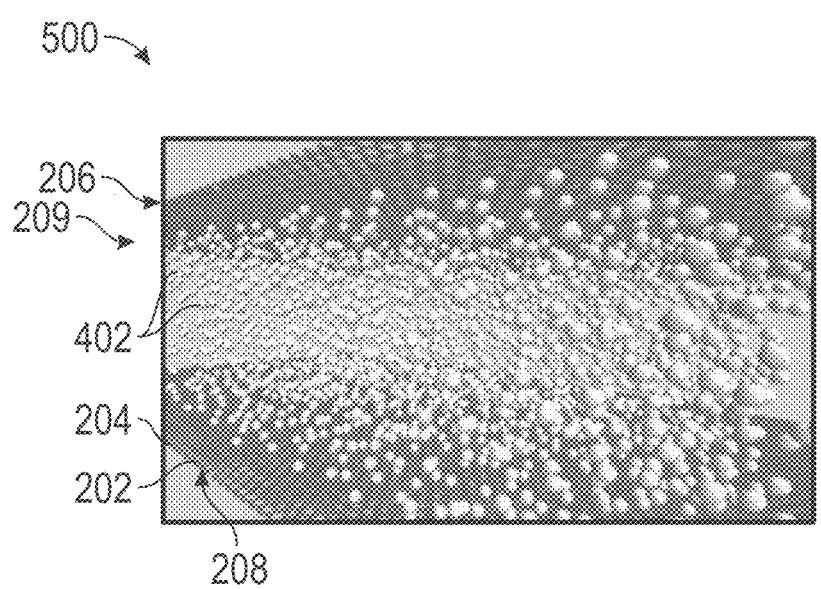

With the rock model 200 and the fluid model 400 prepared, the fluid-rock model may be generated. FIGS. 5 and 6 illustrate two views of an example of a combined fluid-rock model 500, which includes the particles 402 of the methane fluid, and the benzene rings 202 forming the graphene layers 204 that define the pore walls 206, 208. In an embodiment, the model 500 may be at a first pressure, while the model 600 is at a second pressure, with the second pressure being greater than the first pressure.

The dynamics of the particles 402 and those making up the benzene rings 202 in the fluid-rock model 500 may be modeled based on the interactions between methane particles 402 and carbon atoms of the benzene rings 202, related to their individual energy. For example, the force field for methane particles 402 and the rock (carbon) may be calculated using an MD simulation. In addition, as shown, a distance from one of the walls (e.g., the pore wall 206) to the center of the pore 209 may be the pore half-length 502. Accordingly, when referring to a direction "along the pore half-length" herein, it will be appreciated that this means in a direction generally normal to the pore walls 206, 208 and toward the center of the pore 209.

Figure 7:
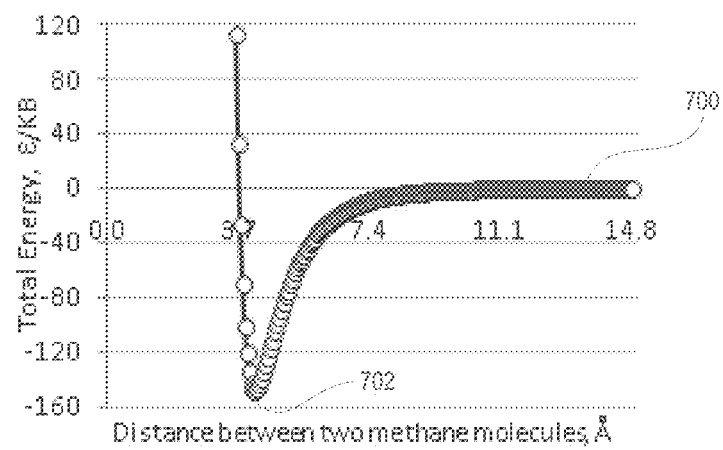
FIG. 7 illustrates a plot of total energy versus distance between two methane molecules, according to an embodiment.
Figure 8:
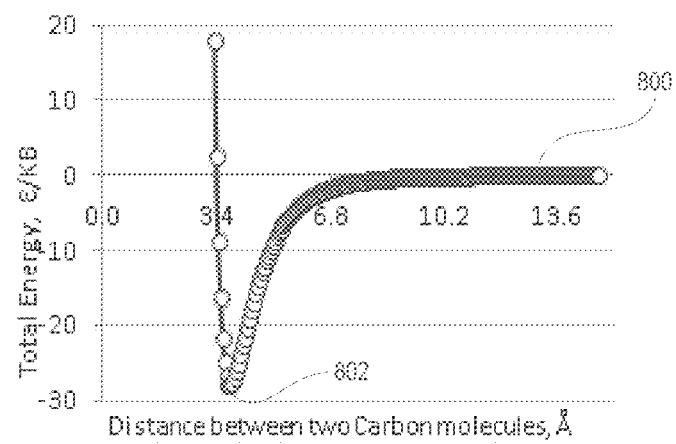
FIG. 8 illustrates a plot of total energy versus distance between two carbon molecules, according to an embodiment.

FIG. 7 illustrates a plot 700 of the total energy versus the distance between two methane molecules, according to an embodiment. FIG. 8 illustrates a plot 800 of the total energy versus the distance between two carbon molecules, according to an embodiment. A Lorentz-Berthelot mixing rule (e.g., $\sigma_{ij}=(\sigma_{ii}+\sigma_{jj})/2$ and $\varepsilon_{ij}=(\varepsilon_{ii}\varepsilon_{jj})^{1/2}$) may be applied to calculate the potential for the rock-fluid interaction, according to an embodiment.

With additional reference to FIGS. 5 and 6, the change in energy when two neighboring methane-methane particles 402 and carbon-carbon particles (of the benzene rings 202) interact with each other is represented in the plots 700 and 800. As the plots 700 and 800 show, when two particles are separated apart by a relatively long distance, a weak attractive force is present, drawing the neighboring particles closer together. At a certain distance, however, it may become increasingly difficult to continue decreasing the distance between the two particles, as the two particles may "invade" each other's space, resulting in the particles repelling. Points of inflection 702, 802 may be defined where the force of repulsion, which may be larger than the force of attraction at small distance, begins to overcome the force of attraction as the distance between two particles reduces. Thus, the energy profile changes from a minor decreasing trend (right of the inflection points 702, 802) to a steep increase (left of the inflection points 702, 802) along the distance between two particles 402. The Lennard-Jones potential may express the relationship illustrated in FIGS. 7 and 8.

The minimum distance between two methane particles 402 may be 3.73 nm and the minimum distance between two carbon particles may be 3.4 nm. As shown in FIGS. 7 and 8, this "minimum" distance may correspond to the point where the plot crosses the 0-total energy axis, i.e., where two molecules are in thermodynamic/kinetic equilibrium. Further, the maximum attractive energies may be about 148K and 28K (represented as negative energies, i.e., below the 0-total energy axis in the plots 700, 800) for methane and carbon, respectively.

Referring again to FIG. 1, with the fluid-rock model 500 created, the method 100 may include running an MD simulation, e.g., until the system being modeled is ergodic, as at 104. Ergodicity is generally reached at a time when the system has no other conserved quantity besides the energy. Once the equilibrium has been reached, given a time interval, the entire motion of the particles in space and time may be defined, such that the reservoir system may be deterministic. In deterministic systems, if a property is known at one instant of time in the phase space of the system, then the property may be determined at any time in the future and past.

The trajectory of the particles in space and time may at least partially represent the evolution, or the dynamics, of the reservoir system being modeled. Once the trajectory of the reservoir system is defined, the information in the microscopic level may be converted into macroscopic terms such as virial pressure, density, internal energy, etc. These thermodynamic properties, and/or others, averaged over a long finite period of time, may be derived from the equations of state and the fundamental thermodynamic equations, taking into account that the system is constrained to a conserved quantity.

Figure 9:
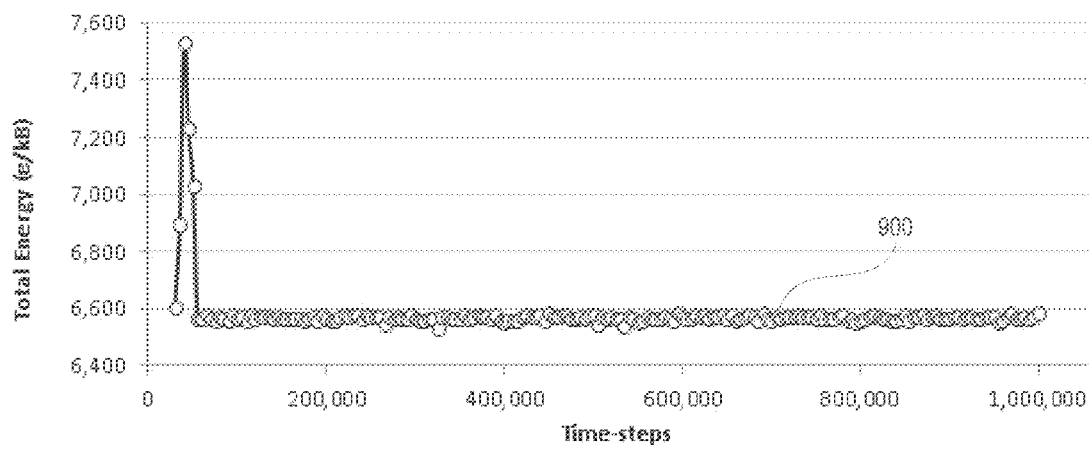
FIG. 9 illustrates a plot of total energy versus time in an MD simulation run of a fluid-rock model, according to an embodiment.

FIG. 9 illustrates a plot 900 of a total energy profile versus time (e.g., denoted by time-steps), according to a specific example embodiment. The plot 900 may represent that energy conservation, in this illustrative example, is reached (e.g., the system is ergodic) at approximately 55,000 time-steps. As such, samples of configurations within the stable region (>55,000 time steps) can be used for analysis of methane density. In this instance, the simulation, using the model of the reservoir system, has been conducted for 1,000,000 timesteps, with the equilibrium having been reached at approximately 55,000 timesteps. In this example, a sample has been taken (e.g., the state of the system is recorded) every 2,000 timesteps from 500,000 onwards. In a specific embodiment, each time-step may be 0.023 picoseconds.

During the MD simulation, the MD configurations may be sampled at a range of pressures and temperatures, e.g., as indicated above in Tables 1 and 2. Referring back to FIGS. 5 and 6, as noted above, the model 500 may be at a first pressure, while the model 600 is at a second pressure, with the second pressure being greater than the first pressure. For example, the first pressure (FIG. 5) may be 3150 psi, and the second pressure (FIG. 6) may be 6250 psi. As shown, the adsorbed density of methane at 3150 psi near the pore wall 208 is larger than the density at the center of the pore 209. When the pressure increases up to 6250 psi (model 600), the density profile in the pore 209 may be more homogenous.

The method 100 may then proceed to calculating a number of particles of the fluid in a unit area of a pore for a plurality of pressures and at least one temperature, as at 106. For example, this may include calculating density profiles taken, e.g., at different pressures and at constant temperature. The density profiles may also be taken for a plurality of temperatures, e.g., according to expected reservoir temperatures; however, in some cases, the temperature may have small impact, as will be discussed below, and thus multiple temperature values may not be included.

Figures 1, 10:
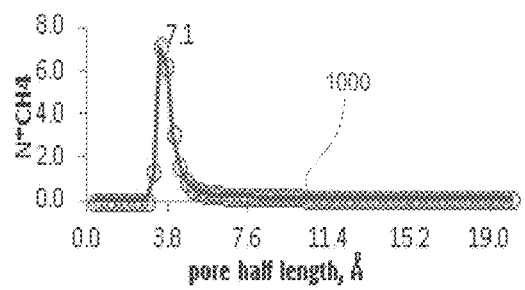
Figures 2, 10:
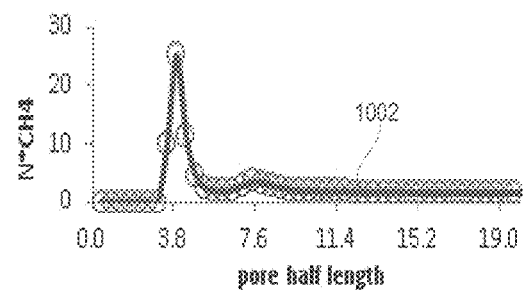

FIGS. 10-1 and 10-2 illustrate plots 1000 and 1002 of results of two example MD simulation runs at two different pressures and one temperature. In this embodiment, the temperature may be about 73° F., which may be representative of a reservoir temperature; however, any suitable temperature may be employed, without limitation. The plots 1000, 1002 show the number of particles as a function of the distance from the pore wall (e.g., along the pore half-length 502, FIG. 10) at two pressures. Plot 1000 is illustrative of the system at the lower pressure, while plot 1002 is illustrative of the system at the higher pressure. For example, the lower pressure may be about 155 psi, while the higher pressure may be about at 1280 psi. It will be appreciated, however, that these two pressures are examples among many pressure points that may be employed. Furthermore, the method 100 may include collecting data by running the MD simulation at three, four, five, 10, 20, 30, 50, 100, or more pressure points and at two, three, four, five, 10, 20, 30, 50, 100 or more temperatures.

The number of particles 402 represented by a point on the plots 1000, 1002 may be a number of particles that fall within a certain distance interval from the pore wall (e.g., along the pore half-length). The distance interval may be a fraction of the width of one of the particles 402. For example, the distance interval may be between about $1/100$, about $1/50$, or about $1/20$ and about $1/2$, about $1/4$, or about $1/8$ of the width of the particle 402. In a specific example, the distance interval may be about $1/10^{th}$ of the width of the particle 402 (in the case of methane, about 0.4 Å).

With the number of particles 402 established as a function of distance from the pore wall, the method 100 may include generating a density profile for the methane at the pressures and temperatures, as at 108. The density profiles may be based on the numbers of particles 402 calculated at 106. Further, a plurality of layers may be defined in the density profile, as at 110. The "layers" may be representative of distance intervals that may or may not manifest as differentiated layers of adsorbed methane, e.g., according to density, as will be discussed below.

Figures 1, 11:
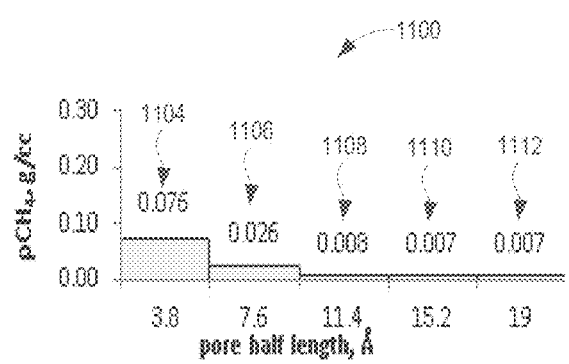
Figures 2, 11:
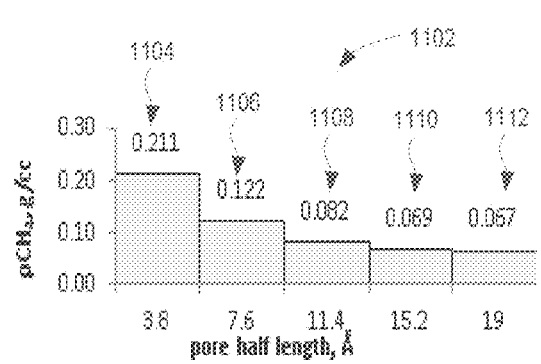

FIGS. 11-1 and 11-2 illustrate two density profiles 1100, 1102, respectively. The illustrated density profiles 1100, 1102 include five layers 1104, 1106, 1108, 1110, 1112. It will be appreciated that any number of layers may be selected. In this embodiment, five layers 1104-1112 may be considered the largest number of discretely forming layers within the range of pressures; however, some samples, models, simulations, etc., may include four or fewer or six or more layers.

The layers 1104-1112 may be considered as bands or distance intervals, with each successive layer being positioned farther away from one of the pore walls and closer to the pore center than is the previous. The layers 1104-1112 may have any suitable width, i.e., in the direction of the pore half-length 502. For example, the width of the layers 1104-1112 may range from about $1/2$, about $2/3$, or about $3/4$ of the width of the particle 402, to about 2 times, about 3 times, or about 5 times the width of the particle 402. In a specific embodiment, the width of the layers 951-955 may be about the same as the width of the particle 402 (in the case of methane, about 3.8 Å).

The value associated with the layers 1104-1112 may be calculated by summing the number of methane particles 402 ($N_{CH4}$) encountered in each volume segment (plots 900, 1000) contained within the distance interval defined by one of the layers 1104-1112, as indicated in the plots 900, 1000. Equation (1) may then be used to calculate the number density ($\rho_{Number}$) for the volume intervals of the layer:

$$\rho_{Number} = \frac{N_{CH4}}{V_{layer}} \qquad (1)$$

where $N_{CH4}$, is the number of methane particles in the volume segments of the layer in the z (pore half-length 502) direction, and $V_{layer}$, is the volume of the layer of methane. It will be appreciated that the layers 1104-1112 may have uniform volumes, but in other cases, may have different volumes. Again, it will be readily appreciated that the calculations discussed herein with respect to methane may be readily employed for any suitable other fluid, e.g., with the notation being changed to indicate the different fluid.

The number density $\rho_{Number}$ (e.g., the number of particles 402 in one of the layers 1104-1112 per unit volume) may then be converted to the local mass density using the molecular weight of the particle 402 (e.g., $M_{CH4}=16.042$ g/mol in the case of methane) and Avogadro's number:

$$\rho_{CH4} = \frac{\rho_{Number} M_{CH4}}{6.02252 * 10^{23}} \quad (2)$$

The number of methane particles 402 and the local mass density $\rho_{CH4}$ thereof may be calculated and plotted along the pore half-length 502 across a plurality of pressure values and at one or more temperature values. For each temperature, density profiles, such as density profiles 1100, 1102, may be created for a plurality of pressures. As can be appreciated in FIG. 11-1, at low pressure and at this particular temperature, two layers 1104, 1106 are present, with the remaining layers 1108-1112 having substantially the same (approximately zero) density. In FIG. 11-2, however, at least three layers 1104-1108 are apparent, with layers 1110, 1112 having substantially the same density as layer 1108 and thus being considered as part of the third layer.

These isothermal density profiles, e.g., when taken across a plurality of pressures, may provide an isothermal adsorption profile. The isothermal adsorption profile may be summarized in plot form for each of the five "layers" 1104-1112. For example, FIGS. 12 and 13 illustrate the isothermal adsorption profiles 1200, 1300 for the layers 1104-1112 at a plurality of pressures and at two different temperatures, respectively.

Using the illustrated isothermal adsorption profiles 1200, 1300, it may be observed that particle 402 (e.g., methane) density may decrease at each layer 1104-1112 proceeding away from the pore wall (e.g., pore wall 208, FIGS. 2 and 3), such that the density reaches the bulk density of the fluid at the center of the pore 209. Increasing from zero pressure, the number of discrete, present adsorbed layers 1104-1112 may increase. For example, at 73° F. and low pressure, two layers 1104, 1106 of methane may be adsorbed (as noted above with reference to FIG. 11-1, the layers 1104, 1106 are present and distinct, while the remaining layers 1108-1112 are nearly zero), and when the pressure increases, three layers of methane may be adsorbed (as noted above with reference to FIG. 11-2, layers 1104-1108 are distinct and present, while layers 1110 and 1112 are generally the same as 1110, yielding three discrete density layers). If the pressure continues to increase, the layers 1104-1112 may become increasingly homogenous, eventually behaving as a single density layer (e.g., continuing to the right, past the end of the illustrated plots of the adsorption profiles 1200, 1300).

Figure 12:
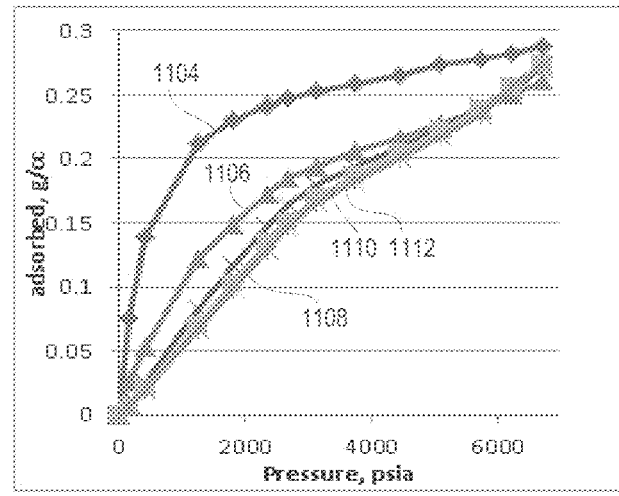
FIGS. 12 and 13 illustrate plots showing summaries of isothermal density profiles for a plurality of layers of the fluid at a plurality of pressures and at two different pressures (one each for FIGS. 11-1 and 11-2), according to an embodiment.
Figure 13:
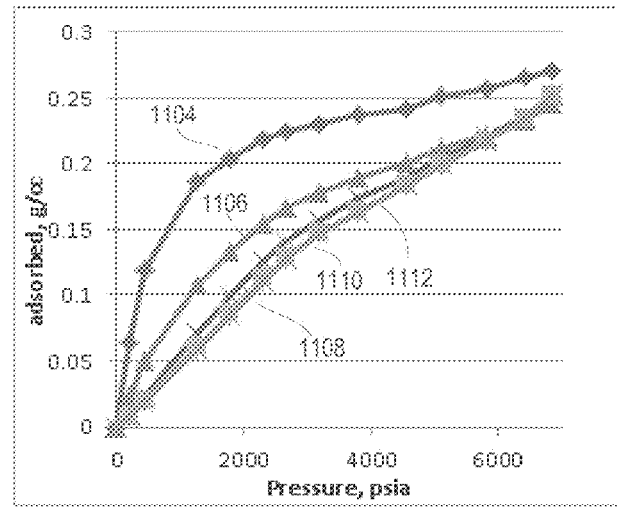

As can be appreciated by comparing FIGS. 12 and 13, which are isothermal adsorption profiles taken at two representative temperatures, temperature may have an attenuated effect, as compared to pressure, on the number of adsorbed layers 1104-1112 present. This may indicate that temperature does not create a substantial effect on minimizing the adsorption profile of methane in a porous medium.

By distinguishing each layer 1104-1112, the excess methane adsorbed by the rock may be measured. The mobility of the adsorbed methane may be reduced compared to the mobility of methane in the center of the pore 209. The densities being higher at the pore-wall level may reflect that more particles 402 make up a single cluster of such particles 402; hence, more energy may be needed to force the adsorbed particles 402 through the pore 209 and initiate the flow when compared to the particles 402 in the center of the pore 209. At very high pressures, the clustering effect may reach the center of the pore 209. The profiles 1200, 1300 observed at pressures above 5500 psia may demonstrate that the density of methane at the center of the pore 209 may be larger than the expected density of bulk methane.

Moreover, confined fluid (e.g., methane) with a profile such as profiles 1200, 1300 may show liquid-like clustering. At high pressure, in such porous medium, the adsorption profile may represent an absence of free methane at the center of the pore 209. Methane within the entire porous medium may act as or similar to as a liquid phase. A transition of methane from an adsorbed condensate-like phase to the whole system becoming liquid-like may thus take place at such high pressure in the porous medium.

As may be appreciated, the highest accumulation of methane particles 402 may be at the first layer 1104, which may be defined immediately adjacent to the pore wall (e.g., the pore wall 206). At lower temperatures, the accumulation at the first layer 1104 may be greater than at higher temperatures, with pressure being equal. In the first layer 1104, the isothermal accumulation may increase with pressure, and may reach a plateau.

At a pressure threshold, e.g., about 6000 psia, the number of adsorbed layers 1104-1112 may decrease to a single layer. That is, the density of the methane in adjacent layers 1104-1112 may be about the same, such that the layers 1104-1112 manifest and behave as a single layer. However, at pressures above the threshold, e.g., 6000 psia, the adsorbed methane may increase back to more than one layer. The density of methane particles 402 at the center of the pore 209 may increase to a value larger than the bulk density, again, indicating a potential change of phase methane at the center of the pore 209, and that the accumulation of methane particles 402 increases, forming a liquid-like phase. According to these simulations, at pressures above the threshold (e.g., 6000 psi), supercritical methane presents a liquid-like profile. For example, the gaseous methane in small pores at high pressures can be liquid-like in some characteristics, due to its increased pressure.

Further, the layers 1110 and 1112 (e.g., the outer layers) may show generally the same profile, demonstrating that 40% of the pore volume is occupied by methane in free phase at pressures below 6000 psia. At pressures above 6000 psia, 20% of the pore volume is occupied by free methane.

Figure 14:
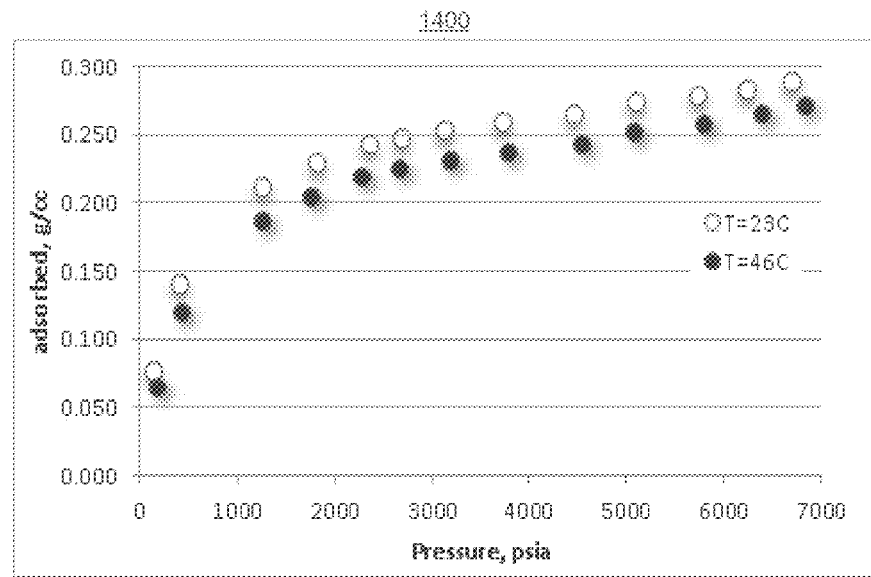
FIG. 14 illustrates a plot of an adsorbed density for the fluid versus pressure for two isotherms, according to an embodiment.

FIG. 14 illustrates a density profile 1400 of the first layer 1104 for the two example temperatures at which the isothermal density profiles 1100 and 1102 were constructed, according to an embodiment. In some cases, desorption may occur at higher temperatures; however, the impact may not effectively transition the adsorbed methane to a free methane. When the pressure is reduced in the reservoir to less than 1000 psia, the temperature effect may be negligible for stimulating desorption. FIG. 14 may, in an embodiment, thus illustrate that heating the reservoir with a ΔT=68° F. may partially desorb the gas trapped in the porous medium, but such desorption may, in some cases, not be as effective as $CO_2$ injection.

Referring again to FIG. 1, the method 100 may then proceed to determining a surface excess mass of methane, as at 112. Surface excess mass ($n_{ex}$) of methane may be defined according to equation 3:

$$n_{ex} = n_{ads} - \rho_{bCH4}(p,T) V_{ads} \text{ [g/g]} \quad (3)$$

where $n_{ads}$ is the total adsorbed mass of the methane normalized to sample weight, $\rho_{bCH4}$ is bulk fluid (e.g., methane) density, as a function of pressure (p) and temperature (7), and $V_{ads}$ is the volume of the adsorbed phase. Further, the surface excess mass $n_{ex}$ of the methane may be calculated from the density profiles, examples of which are provided in and discussed above with respect to FIGS. 11-2 and 11-2 and summarized in FIGS. 12 and 13.

Figures 1, 15:
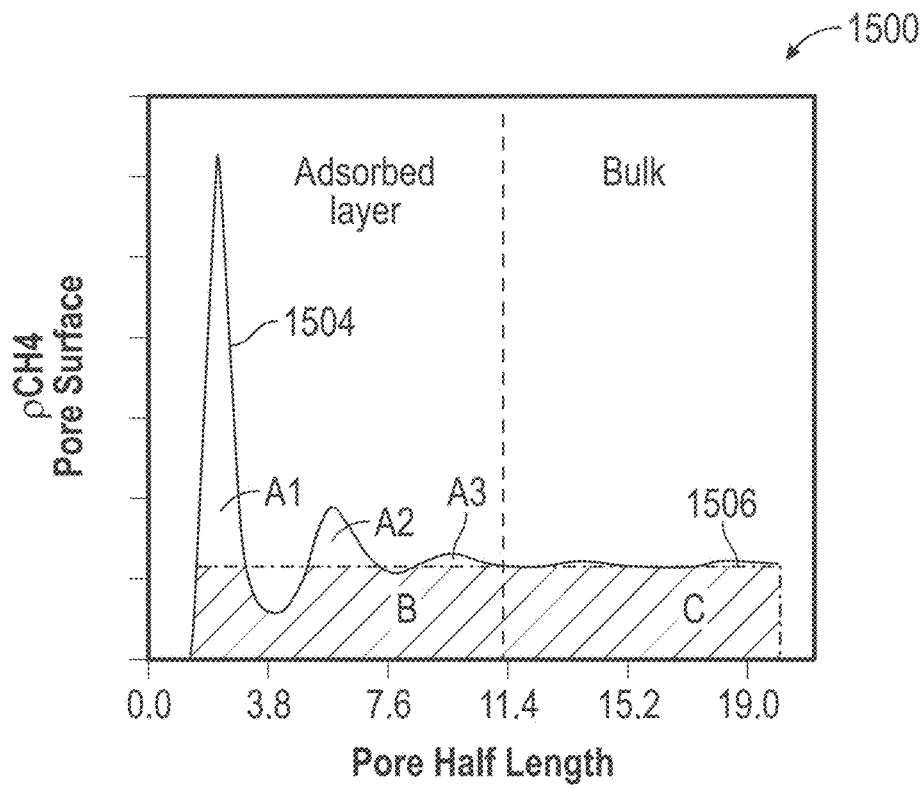
Figures 2, 15:
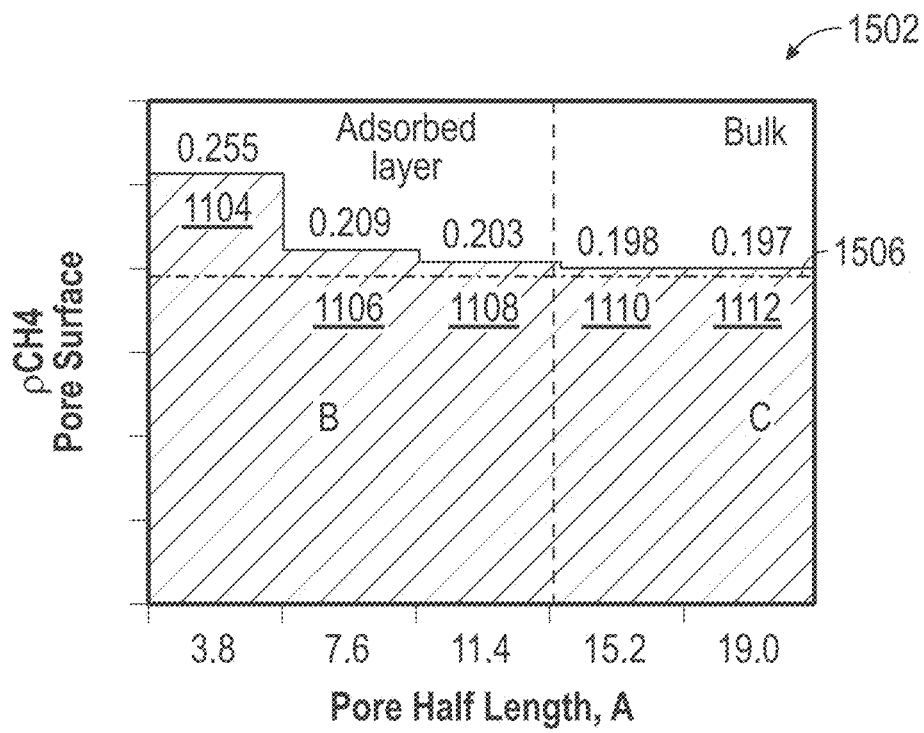

FIGS. 15-1 and 15-2 depict two additional example adsorbed density profiles 1500, 1502, illustrating a distinction between $n_{ex}$ and $n_{ads}$, according to an embodiment. In particular, FIG. 15-1 depicts a continuous relationship (e.g., curve 1504) between density and distance from the pore wall. The surface excess mass $n_{ex}$ is related to the sum of areas under the continuous density curve 1504 and above the bulk density value, represented by line 1506. Thus, the surface excess mass $n_{ex}$ may be calculated as the sum of areas $A_1$, $A_2$, and $A_3$. The cumulative mass of methane in ($A_1+A_2+A_3+B$) corresponds to the total adsorbed mass of methane ($n_{ads}$) and area C corresponds to the mass of free/bulk methane.

As can be appreciated, then, in FIG. 15-2, the areas may be more readily calculated by reference to the discrete layers 1104-1112 of the density profiles discussed above. The areas $A_1$, $A_2$, and $A_3$, representing the surface excess mass $n_{ex}$ may thus be calculated as the difference between the values calculated for the adsorbed layers 1104-1108 minus the bulk density represented by the line 1506. Accordingly, molecular dynamics reveals the distinction between adsorbed, excess, and free mass levels.

However, the surface excess mass $n_{ex}$ may not be directly measured, and thus the volume and the density of the adsorbed phase may not be known. Considering the values shown in FIG. 15-2 for the three adsorbed layers 1104-1108 and the referenced bulk density of, in this example, methane at the pressure and temperature given, the surface excess mass $n_{ex}$ of methane may be estimated using equation (4) as:

$$n_{ex}=[(0.255-0.197)+(0.209-0.197)+(0.203-0.197)] \text{ [g/cc]} \quad (4)$$

The surface excess mass $n_{ex}$ may be expressed in mmol/m² using the molecular weight of the particle (e.g., methane, $M_{CH4}$), and the pore surface area.

Figure 16:
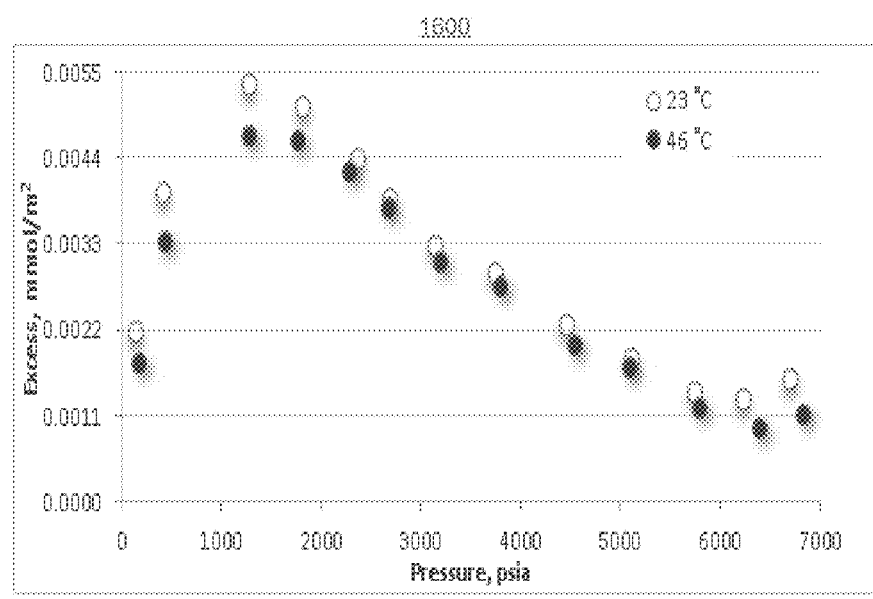
FIG. 16 illustrates a plot of surface excess mass versus pressure for two isotherms, according to an embodiment.

FIG. 16 illustrates a profile 1400 of an excess of methane for two isotherms, e.g., at 73° F. and 115° F. As shown, at lower pressures and lower temperatures, the excess mass of methane in the porous medium is larger. This is consistent with the discrete adsorption profiles discussed above, in which the methane in excess is trapped in the adsorbed region, e.g., at pressures below 6000 psia. FIG. 16 further indicates that when the temperature is low, the kinetic energy is also low, and most of the methane is trapped in the porous medium, yielding a greater excess than when the kinetic energy is increased. When kinetic energy increases, some of the excess molecules of methane flow toward the center of the pore reducing the excess desorption that occurs. This feature may, however, be distinguishable at pressures below 2000 psi and above 6000 psia. When the reservoir pressure falls in between 2000 and 6000 psia, the temperature effects may be negligible.

Moreover, from FIGS. 13 and 14, at this pore scale, less than 50% of the pore volume is occupied by free methane, and 40% of the pore volume is occupied by free/bulk gas.

Referring again to FIG. 1, the method 100 may then proceed to validating the MD isotherms, e.g., using laboratory measurements, as at 110. The MD isotherms may be validated, for example, by calculating the surface excess mass of the methane (or another particle type) at different pressures and temperatures, using samples with known or measured surface areas.

In an embodiment, high-sorption pressure experiments may be conducted, e.g., to calculate surface excess mass of methane. Samples such as Vycor, Charcoal 1, Charcoal 2, and Alumina may be used for the measurement. Cores of Niobrara, Mancos and Haynesville Shale samples, or any other suitable samples, may also be used for the analysis.

Sorption measurements may be performed on a nanometric setup at a variety of temperatures, e.g., 73.4° F. and 114° F. for varying pressures, e.g., from 527 psi to 3016 psi. The general experimental assembly may include a measuring cell (MC) and a reference cell (RC), two high pressure shut-off valves, a high-precision pressure transducer, e.g., with temperature stability of 0.02° C. The MC and RC may be maintained at constant temperature in an oil bath and may be controlled to ±0.1° C. Dry powdered samples crushed to 60~mesh to minimize the time required to diffuse through a sample may be used for the measurements.

Next, the surface excess mass of the methane may be calculated. Sorption isotherms obtained experimentally may be defined by the same principles given in Equation 3. Adjusting the notation of each variable from the left hand side of the Equation 3 results in Equation 5:

$$n_{ex}=n_{total}-\rho_{bCH4}(p,T)V_{void} \text{ [mmol/m}^2\text{]} \quad (5)$$

where $n_{total}$ denotes the total mass of methane normalized to sample weight transferred into the measuring cell (MC), and $V_{void}$ is the void volume of the MC determined by helium expansion at the experimental temperature (e.g., 73.4° F. and 114° F.). The bulk methane density $\rho_{bCH4}(p,T)$, as function of pressure and temperature, may be acquired from a library, such as that provided by NIST.

The MD simulation and experimental results may then be compared to determine whether the experimental results validate the MD simulation, as at 113 (FIG. 1). Methane gas confined to the porous medium at high pressures, as noted above, may become liquid-like with an increase in the densities at all positions in the pore 209, to values close to those of the liquid phase thereof. At low pressures, the methane is in a condensed phase, whereas at higher pressures, clusters of condensed methane may become larger, and the number of methane particles may increase compared to the bulk density at the same pressure. Thus, the surface excess mass may increase. The difference in the surface excess mass of methane in both graphs reflects the difference in surface area for both samples. While the NMR measured sample has a surface area of 250 m²/g, the model in the MD simulation has a surface area of about 568 m²/g.

Parameterizing the MD simulation and experimental results illustrates the difference between the results of the present method and those obtained using a modified-Langmuir model. The modified Langmuir equation may be stated as:

$$n_{ex} = n_L \frac{P}{P+P_L}\left(1 - \frac{\rho_{g(P,T)}}{\rho_{ads}}\right) \text{ [mmol/g]} \quad (6)$$

where the three-parameter Langmuir-based excess sorption functions are: Langmuir sorption capacity $n_L$, in mmol/g; the Langmuir pressure $P_L$, in psia and the adsorbed phase density $\rho_{ads}$, in mmol/mL.

Figure 17:
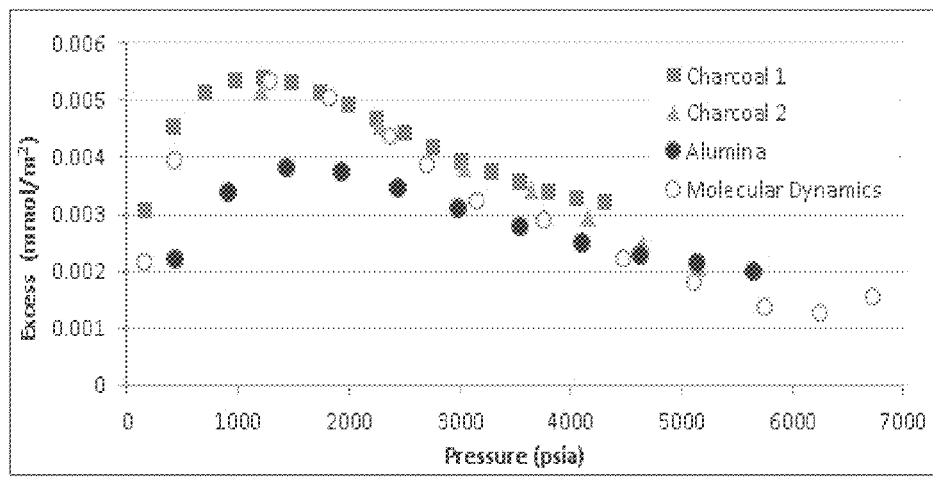
FIG. 17 illustrates a plot of surface excess mass versus pressure for three experimentally measured materials, in comparison to the MD simulation values, according to an embodiment.
Figure 18:
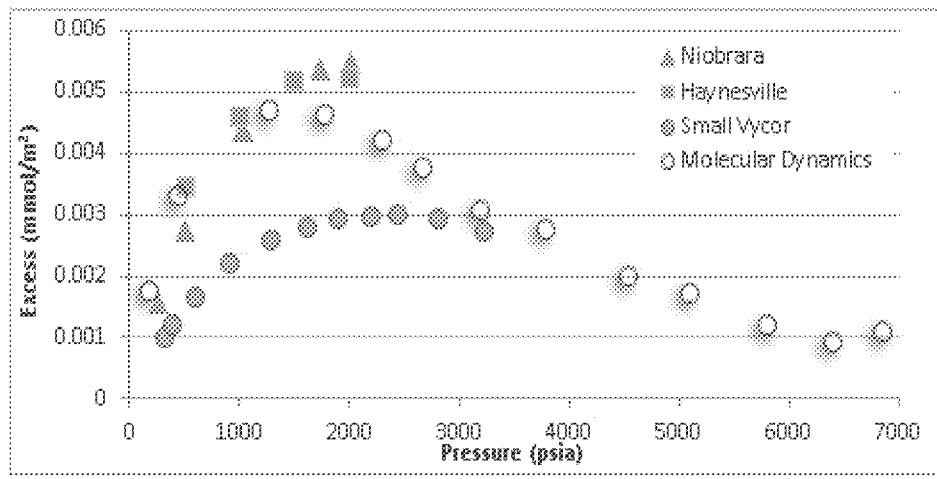
FIG. 18 illustrates a plot of surface excess mass versus pressure for three measured formations, in comparison to MD simulation values, according to an embodiment.

To complete a parameterization process, a plot of surface excess mass of methane vs pressure from experimental data collected in each of the samples and MD simulation data, such as the plots 1700 and 1800 shown in FIGS. 17 and 18, respectively, may be prepared. Next, the bulk methane density for the particles (methane) at the temperature and pressures for which the experiment has been conducted may be retrieved. Then, values for the three-parameters: $n_L$, $P_L$ and $\rho_{ads}$ are selected to calculate $n_{ex}$; such that the resulting $n_{ex}$ vs. P fits the experimental excess sorption data using, for example, a least square minimization process. Per each isotherm, a different set of three parameters may need to be chosen.

Figure 19:
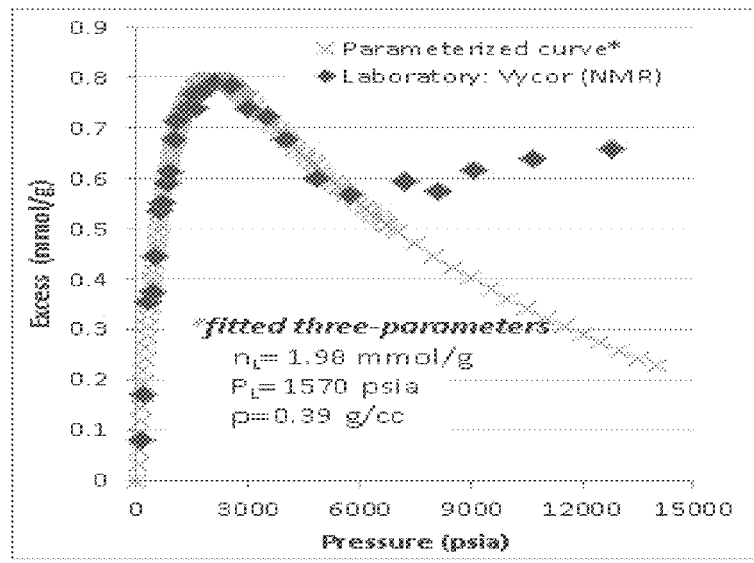
FIGS. 19 and 20 illustrate plots of a parameterized curve based on a modified Langmuir equation and MD simulation results, according to an embodiment.
Figure 20:
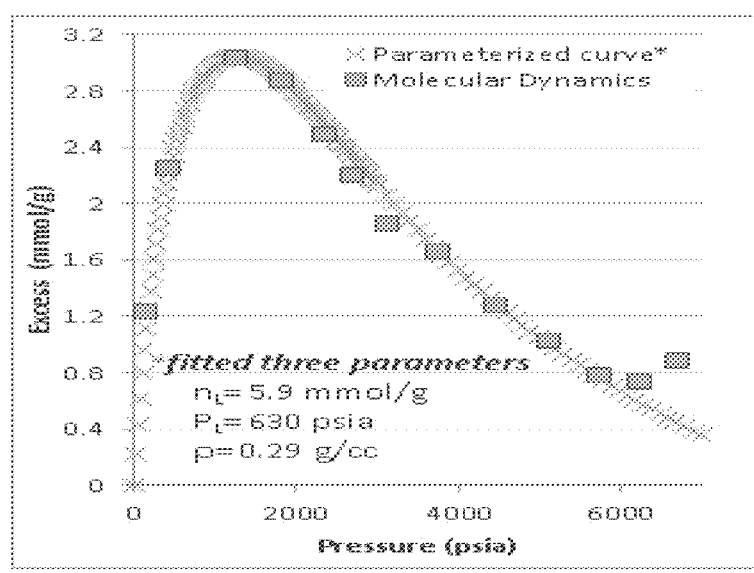

FIGS. 19 and 20 illustrate plots of the three parameters summarized for experimental and MD simulation results at 74° F. The parameters differ for each sample even though the results correspond to a single isotherm, as they have different surface areas. The three parameter fit provides an accurate representation of the experimental and MD simulation data at lower pressures, e.g., less than about 6000 psia. At pressures above 6000 psia, for both plots 1900, 2000, parameterization of the results based on Eq. 3 leads to conclusions that deviate from what it is found in the laboratory and by MD simulation.

This shows the difficulty in using the modified-Langmuir Isotherm in finding a value for the density of the adsorbed methane in the porous medium. As such, an estimate, with a high degree of uncertainty, of the density may be employed. Moreover, as can be seen in the MD simulation results discussed above, there may not be a unique value for adsorbed density of methane at each pressure. Thus, finding a unique value to fit the curve may attenuate the usability of the modified-Langmuir equation in this context.

Referring again to the method 100 of FIG. 1, with the experimentally-validated isotherm results, the method 100 may proceed to extending the MD-generated isotherms to a range of shale types, as at 114. Rock samples, such as shale samples, from unconventional reservoirs may have a range of different surface areas. For example, such surface areas may range from about 50 to about 1000 m²/g. Using equation (7), the profile of a new shale sample may be found:

$$Excess_{new\_shale}\left(\frac{mmol}{g}\right) = Excess_{MD\_isotherm}\left(\frac{mmol}{m^2}\right) * Surface\ area_{new\_shale}\left(\frac{m^2}{g}\right) \quad (7)$$

The $Excess_{new\_shale}$ may be referred to as a "second gas accumulation," which may be calculated based on a pore surface area of the shale in combination with the $Excess_{MD\_isotherm}$ (calculated using the surface excess mass $n_{ex}$) at the pressure of the reservoir system from which the shale is received. The nanometric-scale pores in shales may be associated with clay minerals and organic matter and may have distinct surface areas. The excess mass of methane in the samples may differ from one another, e.g., according to surface area. Accordingly, a profile of excess methane in the shale may be generated for this second reservoir system, based on the MD simulations of the first, modeled reservoir system.

Figure 21:
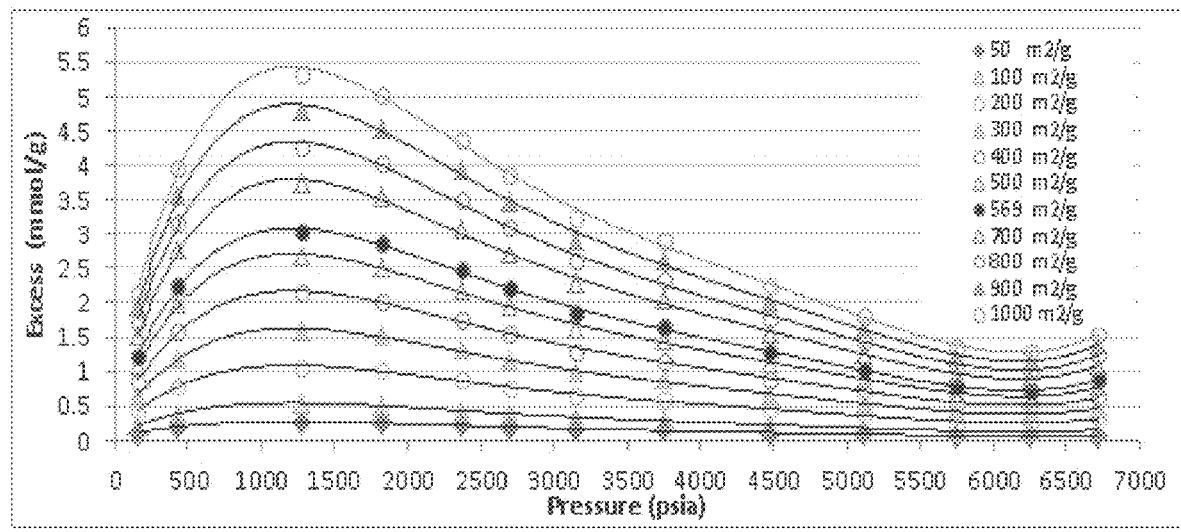
FIGS. 21 and 22 illustrate plots of isothermal surface excess mass versus pressure for several pore surface areas, according to an embodiment.
Figure 22:
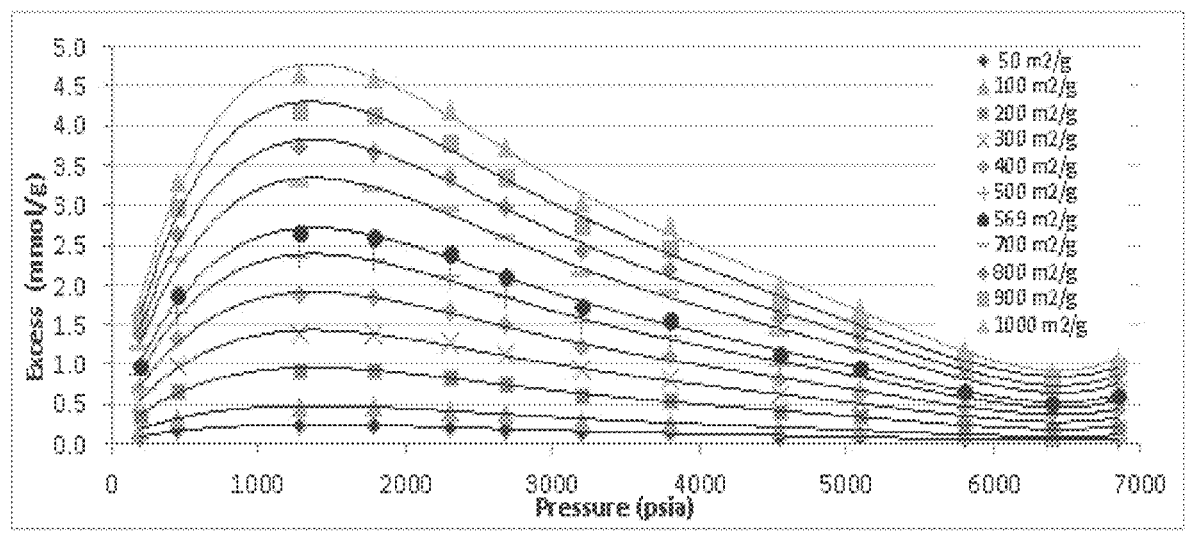

FIGS. 21 and 22 illustrate isotherms of surface excess mass of adsorbed methane at each pressure change in the reservoir for clay and organic samples for a range of pore surface areas (e.g., average pore surface areas). Thus, with a known mineralogy of a core/outcrop sample, and a known pore surface area (Surface area$_{new\_shale}$), a resultant isotherm curve of excess adsorbed methane as a function of pressure may be found by using the isotherms shown in FIGS. 21 and 22, according to an embodiment.

Accordingly, embodiments of the present disclosure may provide a method that includes applying an isotherm database created using molecular dynamics simulations. This method may be used for the volumetric calculation of gas in place with a combination of the reservoir simulators or in isolation. Such data may also be an input for reservoir simulators, as at 116 (FIG. 1) such as INTERSECT®, ECLIPSE® and PETREL®. Furthermore, the method 100 may extend the database to different types of shale reservoirs.

The isotherm dataset may also be modified to include the mineralogy and/or the composition of the rock. Some examples of this include: Montmorollinite, Illite, Chlorite, Kerogen, Smectite, etc.

Embodiments of the method may also provide complete hydrocarbon volumetrics with the help of cutting and or core data. Thus, even in the absence of logs, reservoir characterisation may be carried out. This may be useful, in at least one embodiment, for unconventional reservoirs where the verticals are logged and the horizontals away from where production happens may not logged. In other embodiments, the methods of the present disclosure may be employed with other types of reservoirs.

The cutting or core data may include pore size distributions, mineralogy, total organic carbon (TOC), pore surface area, and/or petrophysical interpretation properties such as water and oil saturations, porosity etc. For example, calculation of volume of reserves can be improved by knowing mineralogy of the sample.

Figure 23:
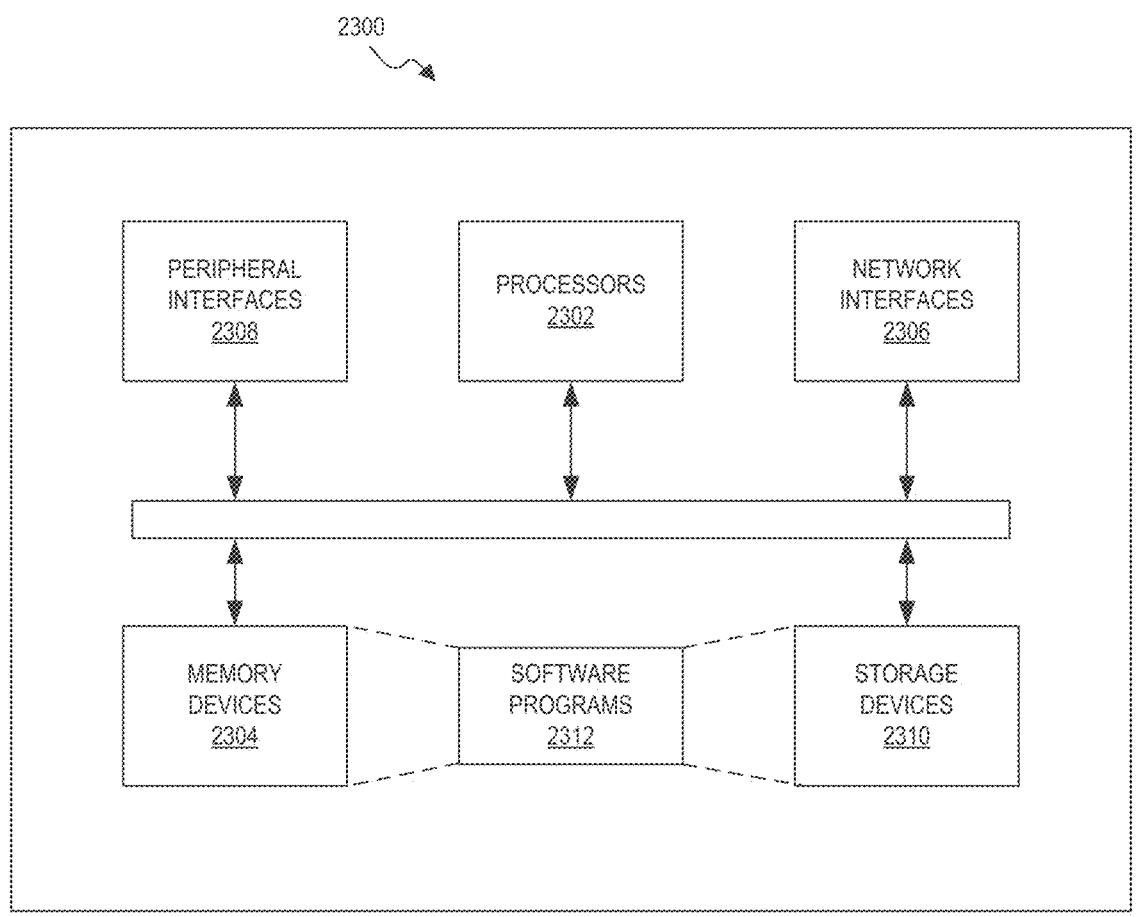
FIG. 23 illustrates a schematic view of a processor system, according to an embodiment.

Embodiments of the disclosure may also include one or more systems for implementing one or more embodiments of the method 100. FIG. 23 illustrates a schematic view of such a computing or processor system 2300, according to an embodiment. The processor system 2300 may include one or more processors 2302 of varying core configurations (including multiple cores) and clock frequencies. The one or more processors 2302 may be operable to execute instructions, apply logic, etc. It will be appreciated that these functions may be provided by multiple processors or multiple cores on a single chip operating in parallel and/or communicably linked together. In at least one embodiment, the one or more processors 2302 may be or include one or more GPUs.

The processor system 2300 may also include a memory system, which may be or include one or more memory devices and/or computer-readable media 2304 of varying physical dimensions, accessibility, storage capacities, etc. such as flash drives, hard drives, disks, random access memory, etc., for storing data, such as images, files, and program instructions for execution by the processor 2302. In an embodiment, the computer-readable media 2304 may store instructions that, when executed by the processor 2302, are configured to cause the processor system 2300 to perform operations. For example, execution of such instructions may cause the processor system 2300 to implement one or more portions and/or embodiments of the method described above.

The processor system 2300 may also include one or more network interfaces 2306. The network interfaces 2306 may include any hardware, applications, and/or other software. Accordingly, the network interfaces 2306 may include Ethernet adapters, wireless transceivers, PCI interfaces, and/or serial network components, for communicating over wired or wireless media using protocols, such as Ethernet, wireless Ethernet, etc.

The processor system 2300 may further include one or more peripheral interfaces 2308, for communication with a display screen, projector, keyboards, mice, touchpads, sensors, other types of input and/or output peripherals, and/or the like. In some implementations, the components of processor system 2300 need not be enclosed within a single enclosure or even located in close proximity to one another, but in other implementations, the components and/or others may be provided in a single enclosure.

The memory device 2304 may be physically or logically arranged or configured to store data on one or more storage devices 2310. The storage device 2310 may include one or more file systems or databases in any suitable format. The storage device 2310 may also include one or more software programs 2312, which may contain interpretable or executable instructions for performing one or more of the disclosed processes. When requested by the processor 2302, one or more of the software programs 2312, or a portion thereof, may be loaded from the storage devices 2310 to the memory devices 2304 for execution by the processor 2302.

Those skilled in the art will appreciate that the above-described componentry is merely one example of a hardware configuration, as the processor system 2300 may include any type of hardware components, including any necessary accompanying firmware or software, for performing the disclosed implementations. The processor system 2300 may also be implemented in part or in whole by electronic circuit components or processors, such as application-specific integrated circuits (ASICs) or field-programmable gate arrays (FPGAs).

The foregoing description of the present disclosure, along with its associated embodiments and examples, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the processor system 2300 may be used to execute programs according to instructions received from another program or from another processor system altogether. Similarly, commands may be received, executed, and their output returned entirely within the processing and/or memory of the processor system 2300. Accordingly, neither a visual interface command terminal nor any terminal at all is strictly necessary for performing the described embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents. Further, in the above description and in the below claims, unless specified otherwise, the term "execute" and its variants are to be interpreted as pertaining to any operation of program code or instructions on a device, whether compiled, interpreted, or run using other techniques.

What is claimed is:

1. A computer-implemented method for reservoir volumetric estimation, comprising:
   running, using a processor, a molecular dynamics simulation of a fluid-rock model of a first reservoir system at a plurality of pressures, wherein the fluid-rock model comprises a fluid that is at least partially adsorbed in the first reservoir system at one or more pressures of the plurality of pressures;
   determining, using the processor, a plurality of isothermal density profiles of the fluid in the first reservoir system, in association with the plurality of pressures using a result of the molecular dynamics simulation, wherein determining the plurality of isothermal density profiles comprises:
      defining a plurality of layers comprising a first layer defined adjacent to a pore wall and a second layer that is defined adjacent to the first layer, such that the first layer is between the second layer and the pore wall; and
      determining respective densities of the respective plurality of layers based on a number of molecules that are in the respective plurality of layers;
   determining, using the processor, a first gas accumulation of the fluid in the first reservoir system for the plurality of isothermal density profiles, wherein the first gas accumulation is at least partially a function of a pore surface area of a sample of the first reservoir system, wherein:
      the sample was captured from a wellbore of the first reservoir system; and
      the first gas accumulation of the fluid that is determined is used for one or more of exploration or production efforts; and
   determining, using the processor and the molecular dynamics simulation, a first plurality of gas accumulation versus pressure curves based at least partially upon the first gas accumulation and at least one of pressure, temperature, composition, or pore surface area as inputs to the molecular dynamics simulation, wherein each of the first plurality of gas accumulation versus pressure curves corresponds to a different pore surface area,
   wherein determining the plurality of isothermal density profiles further comprises:
      defining a volume operator having a dimension that is less than a diameter of one of the molecules of the fluid;
      determining the number of molecules at distance intervals from the pore wall, wherein the distance intervals have a width substantially equal to the dimension of the volume operator; and
      determining one of the plurality of isothermal density profiles, in association with one of the plurality of pressures, based on the number of molecules determined for each of the distance intervals; and
   wherein the layers have a width along the pore half-length that is larger than the dimension of the volume operator, and wherein the first layer is between the second layer and the pore wall along the pore half-length.

2. The method of claim 1, further comprising:
   receiving a pore surface area of a sample of a second reservoir system, wherein the second reservoir system comprises a fluid of a same type as the fluid of the first reservoir system; and
   determining, using the processor, a second gas accumulation of the fluid in the second reservoir system based on the pore surface area of the sample of the second reservoir system and the first gas accumulation.

3. The method of claim 2, further comprising receiving a formation pressure associated with the second reservoir system, wherein the second gas accumulation is determined using the formation pressure.

4. The method of claim 1, wherein running the molecular dynamics simulation comprises running the molecular dynamics simulation until the fluid-rock model is ergodic.

5. The method of claim 1, further comprising constructing the fluid-rock model using a fluid model, a bulk density of the fluid, and a rock model comprising a pore volume.

6. The method of claim 1, wherein determining the gas accumulation of the fluid comprises subtracting a bulk density from the respective densities of the plurality of layers, to generate the first gas accumulation.

7. The method of claim 1, wherein the fluid is methane.

8. The method of claim 1, further comprising validating the first gas accumulation using experimental measurements of rock from another reservoir system.

9. The method of claim 1, further comprising determining the pore surface area of the sample.

10. The method of claim 1, further comprising building or updating a model of the first reservoir system based at least partially upon the first gas accumulation to facilitate a determination about whether the first reservoir system is viable to produce hydrocarbons.

11. The method of claim 1, wherein the different pore surface areas correspond to different types of shale.

12. The method of claim 1, wherein each of the first plurality of gas accumulation versus pressure curves has a maximum gas accumulation at a pressure between about 500 pounds per square inch absolute (psia) and about 2000 psia.

13. The method of claim 1, wherein the first plurality of gas accumulation versus pressure curves correspond to a first temperature, and further comprising determining, using the processor, a second plurality of gas accumulation versus pressure curves, each of the second plurality of gas accumulation curves corresponding to a different pore surface area and to a second temperature that is different from the first temperature.

14. The method of claim 1, wherein the first plurality of gas accumulation versus pressure curves are determined using a product of the first gas accumulation and the different pore surface areas.

15. A non-transitory computer-readable medium storing instructions, that, when executed by a processor, cause the processor to perform operations, the operations comprising:
running a molecular dynamics simulation of a fluid-rock model of a first reservoir system at a plurality of pressures, wherein the fluid-rock model comprises a fluid that is at least partially adsorbed in the first reservoir system at one or more pressures of the plurality of pressures;
determining a plurality of isothermal density profiles of the fluid in the first reservoir system, in association with the plurality of pressures using a result of the molecular dynamics simulation, wherein determining the plurality of isothermal density profiles comprises:
defining a plurality of layers comprising a first layer defined adjacent to a pore wall and a second layer that is defined adjacent to the first layer, such that the first layer is between the second layer and the pore wall; and
determining respective densities of the respective plurality of layers based on a number of molecules that are in the respective plurality of layers;
determining a first gas accumulation of the fluid in the first reservoir system for the plurality of isothermal density profiles, wherein the first gas accumulation is at least partially a function of a pore surface area of a sample of the first reservoir system, wherein:
the sample was captured from a wellbore of the first reservoir system; and
the first gas accumulation of the fluid that is determined is used for one or more of exploration or production efforts; and
determining, using the molecular dynamics simulation, a first plurality of gas accumulation versus pressure curves based at least partially upon the first gas accumulation and at least one of pressure, temperature, composition, or pore surface area as inputs to the molecular dynamics simulation, wherein each of the first plurality of gas accumulation versus pressure curves corresponds to a different pore surface area;
wherein determining the plurality of isothermal density profiles further comprises:
defining a volume operator having a dimension that is less than a diameter of one of the molecules of the fluid;
determining the number of molecules at distance intervals from the pore wall, wherein the distance intervals have a width substantially equal to the dimension of the volume operator; and
determining one of the plurality of isothermal density profiles, in association with one of the plurality of pressures, based on the number of molecules determined for each of the distance intervals; and
wherein the layers have a width along a pore half-length that is larger than the dimension of the volume operator, and wherein the first layer is between the second layer and the pore wall along the pore half-length.

16. The medium of claim 15, wherein the operations further comprise:
receiving a pore surface area of a sample of a second reservoir system, wherein the second reservoir system comprises a fluid of a same type as the fluid of the first reservoir system; and
determining, using the processor, a second gas accumulation of the fluid in the second reservoir system based on the pore surface area of the sample of the second reservoir system and the first gas accumulation.

17. The medium of claim 16, wherein the operations further comprise receiving a formation pressure associated with the second reservoir system, wherein the second gas accumulation is determined using the formation pressure.

18. The medium of claim 15, wherein the operations further comprise determining the pore surface area of the sample.

19. A computing system comprising:
one or more processors; and
a memory system comprising one or more computer-readable media storing instructions that, when executed by at least one of the one or more processors, cause the computing system to perform operations, the operations comprising:
running a molecular dynamics simulation of a fluid-rock model of a first reservoir system at a plurality of pressures, wherein the fluid-rock model comprises a fluid that is at least partially adsorbed in the first reservoir system at one or more pressures of the plurality of pressures;
determining a plurality of isothermal density profiles of the fluid in the first reservoir system, in association with the plurality of pressures using a result of the molecular dynamics simulation, wherein determining the plurality of isothermal density profiles comprises:
defining a plurality of layers comprising a first layer defined adjacent to a pore wall and a second layer that is defined adjacent to the first layer, such that the first layer is between the second layer and the pore wall; and
determining respective densities of the respective plurality of layers based on a number of molecules that are in the respective plurality of layers;

determining a first gas accumulation of the fluid in the first reservoir system for the plurality of isothermal density profiles, wherein the first gas accumulation is at least partially a function of a pore surface area of a sample of the first reservoir system, wherein:
the sample was captured from a wellbore of the first reservoir system; and
the first gas accumulation of the fluid that is determined is used for one or more of exploration or production efforts; and
determining, using the molecular dynamics simulation, a first plurality of gas accumulation versus pressure curves based at least partially upon the first gas accumulation and at least one of pressure, temperature, composition, or pore surface area as inputs to the molecular dynamics simulation, wherein each of the first plurality of gas accumulation versus pressure curves corresponds to a different pore surface area
wherein determining the plurality of isothermal density profiles further comprises:
defining a volume operator having a dimension that is less than a diameter of one of the molecules of the fluid;
determining the number of molecules at distance intervals from the pore wall, wherein the distance intervals have a width substantially equal to the dimension of the volume operator; and
determining one of the plurality of isothermal density profiles, in association with one of the plurality of pressures, based on the number of molecules determined for each of the distance intervals; and
wherein the layers have a width along a pore halflength that is larger than the dimension of the volume operator, and wherein the first layer is between the second layer and the pore wall along the pore halflength.

20. The system of claim 19, wherein the operations further comprise:
receiving a pore surface area of a sample of a second reservoir system, wherein the second reservoir system comprises a fluid of a same type as the fluid of the first reservoir system; and
determining, using the one or more processors, a second gas accumulation of the fluid in the second reservoir system based on the pore surface area of the sample of the second reservoir system and the first gas accumulation.

* * * * *